(12) United States Patent
Zakharov

(10) Patent No.: US 11,669,704 B2
(45) Date of Patent: Jun. 6, 2023

(54) DOCUMENT CLASSIFICATION NEURAL NETWORK AND OCR-TO-BARCODE CONVERSION

(71) Applicant: KYOCERA Document Solutions, Inc., Osaka (JP)

(72) Inventor: Oleg Y. Zakharov, Walnut Creek, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 14 days.

(21) Appl. No.: 17/010,632

(22) Filed: Sep. 2, 2020

(65) Prior Publication Data

US 2022/0067320 A1 Mar. 3, 2022

(51) Int. Cl.
| | | |
|---|---|---|
| G06K 7/14 | (2006.01) | |
| G06K 19/06 | (2006.01) | |
| G06F 40/166 | (2020.01) | |
| G06N 3/08 | (2023.01) | |
| G06F 16/953 | (2019.01) | |
| G06V 30/416 | (2022.01) | |
| G06V 30/10 | (2022.01) | |

(52) U.S. Cl.
CPC ......... *G06K 7/1417* (2013.01); *G06F 16/953* (2019.01); *G06F 40/166* (2020.01); *G06K 7/1413* (2013.01); *G06K 19/06028* (2013.01); *G06K 19/06037* (2013.01); *G06N 3/08* (2013.01); *G06V 30/416* (2022.01); *G06V 30/10* (2022.01)

(58) Field of Classification Search
CPC .. G06K 7/1417; G06K 7/14; G06K 19/06037; G06K 19/06103
USPC ...... 235/462.1, 462.09, 462.07, 462.01, 375; 382/237
See application file for complete search history.

(56) References Cited

U.S. PATENT DOCUMENTS

| | | | |
|---|---|---|---|
| 5,901,224 | A | 5/1999 | Hecht |
| 6,389,151 | B1 | 5/2002 | Carr et al. |
| 6,631,495 | B2 | 10/2003 | Kato et al. |
| 7,246,309 | B2 | 7/2007 | Hallett et al. |
| 7,349,577 | B2 | 3/2008 | Kaneda et al. |
| 8,014,039 | B2 | 9/2011 | Nohtomi |
| 8,289,541 | B2 | 10/2012 | Garg et al. |
| 8,644,546 | B2 | 2/2014 | Conwell |
| 9,165,062 | B2 | 10/2015 | Knight |
| 9,552,570 | B2 | 1/2017 | Morimoto et al. |
| 2006/0030969 | A1 | 2/2006 | Norris et al. |
| 2007/0047008 | A1* | 3/2007 | Graham ............... G06K 9/325 358/401 |
| 2007/0192729 | A1 | 8/2007 | Downs |
| 2014/0250360 | A1 | 9/2014 | Jiang et al. |

(Continued)

FOREIGN PATENT DOCUMENTS

JP 2004260750 A * 9/2004

Primary Examiner — Edwyn Labaze
(74) Attorney, Agent, or Firm — Rowan TELS LLC

(57) ABSTRACT

Document classification techniques are disclosed that convert text content extracted from documents into graphical images and apply image classification techniques to the images. A graphical image of the text (such as a bar-code) may be generated and applied to improve the performance of document classification, bypassing NLP and utilizing more efficient localized OCR than in conventional approaches.

15 Claims, 11 Drawing Sheets

(56) References Cited

U.S. PATENT DOCUMENTS

| | | | |
|---|---|---|---|
| 2014/0263654 A1* | 9/2014 | Davis | G06Q 50/18 |
| | | | 235/487 |
| 2014/0281912 A1 | 9/2014 | Doi | |
| 2015/0310000 A1 | 10/2015 | Schijvenaars et al. | |
| 2017/0091321 A1 | 3/2017 | Morimoto et al. | |
| 2017/0257516 A1* | 9/2017 | Panda | H04N 1/4413 |
| 2018/0154676 A1 | 6/2018 | Rothschild | |
| 2018/0300315 A1* | 10/2018 | Leal | G06F 40/268 |

\* cited by examiner

DOCUMENT CLASSIFICATION NEURAL NETWORK AND OCR-TO-BARCODE CONVERSION

BACKGROUND

Many existing document classification applications utilize OCR (optical character recognition) and NLP (natural language processing) techniques, in which text (symbolic content) is extracted from digital images of scanned documents, analyzed, and used to classify the documents. These applications utilize a text-based classification approach. Other applications utilize image-based classification, such as classification based on pictures, object detection, and computer vision. However existing image-based and NLP classification approaches may be less efficient or accurate than desired.

BRIEF SUMMARY

A system includes a document parser, an image generator, a neural network, and a search engine. The document parser may be configured to extract a content sub-region from a document. The image generator may be configured to transform the content sub-region into a graphical code. "Image generator" refers to logic that generates image content. Many types of image generators are known in the art. Embodiments of a uniquely configured image generator are described herein. "Content sub-region" refers to a physical region within and less than the total region of a document page or pages that incudes content (meaning, is not empty of symbols or graphics). A content sub-region may typically be a rectangular region within a single page of a document, but in some cases could be non-rectangular and/or span pages or comprise, in total, disjoint regions on a same or different page of a document.

The neural network may be trained to output one or more classifiers in response to receiving the graphical code. The search engine may be operable on the neural network to return the one or more classifiers in response to a search request.

A method involves transforming a sub-region of a document from a rasterized format to text using optical character recognition, wherein the optical character recognition is confined to the sub-region. The method further involves bypassing natural language processing to transform the text into a graphical code. The method trains a neural network with the graphical code labeled with one or more classifiers.

A non-transitory computer-readable storage medium, the computer-readable storage medium including instructions that when executed by a computer, cause the computer to transform a sub-region of a document from a rasterized format to text and topological features, wherein the transformation is confined to the sub-region. The instructions may cause the computer to bypass natural language processing to transform the text and topological features into a graphical code. The instructions may cause the computer to embed the graphical code in the document.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Document classification techniques are disclosed that convert content extracted from documents into graphical images and apply image classification techniques to the images. A graphical image of extracted text (such as a bar-code) may be generated and applied to improve the performance of document classification, bypassing NLP and utilizing efficient localized OCR in contrast with conventional approaches.

A neural network configured with an image training set may be utilized for image classification in some embodiments. For example a convolutional neural network may be utilized. A bar-code or QR-code image may be generated from any one or more of text, graphics, and topological features extracted from a document using localized OCR, and without utilizing NLP on the extracted content. The generated image may then be inserted into the document at a particular location, providing a localized and reliably accurate classification marker.

Figure 1:
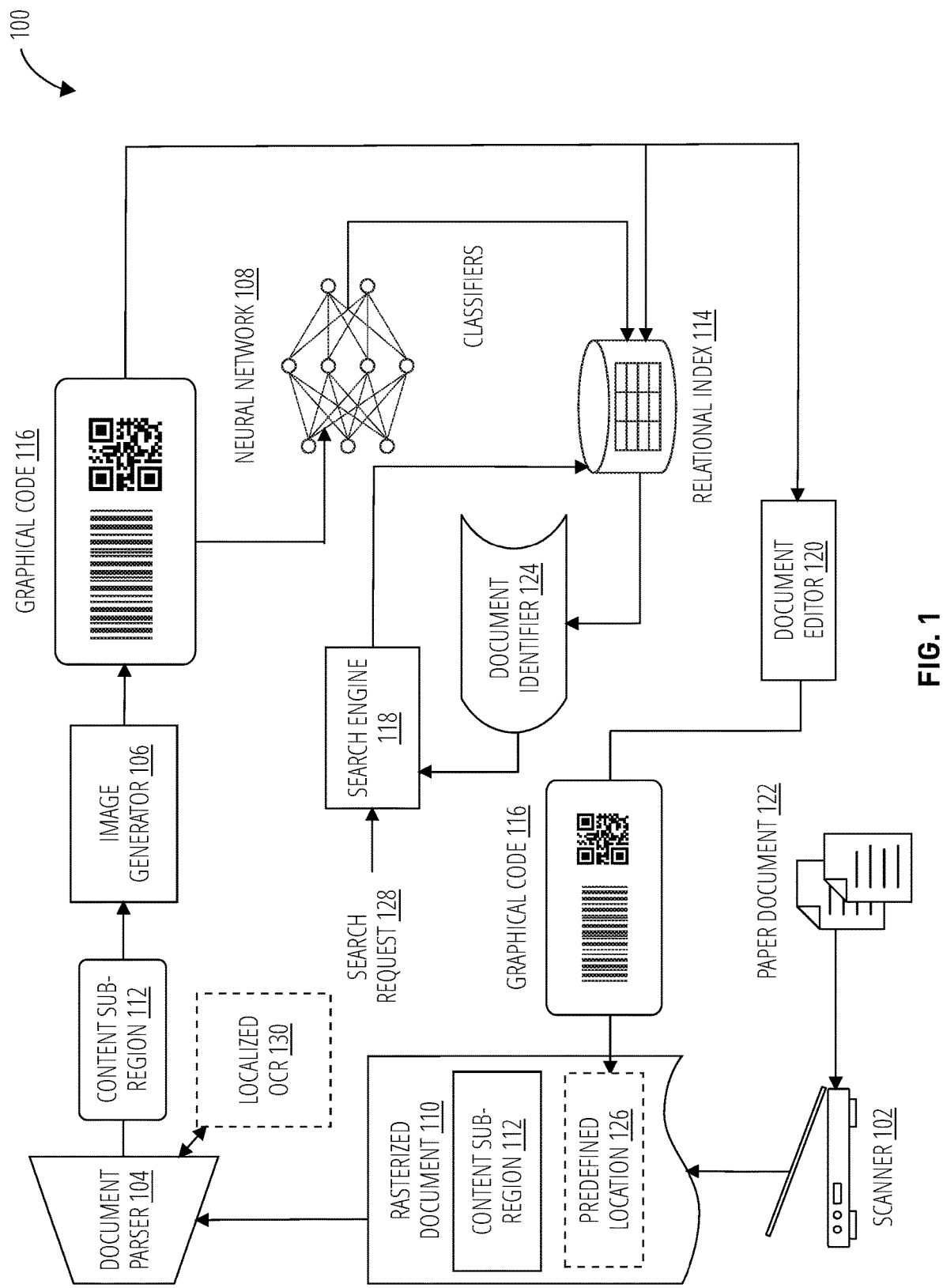
FIG. 1 is a block diagram depiction of a document processing system 100 in accordance with one embodiment.

FIG. 1 depicts a document processing system 100 in accordance with one embodiment. In overview, the document processing system 100 comprises a document parser 104, an image generator 106, a neural network 108, a relational index 114, a search engine 118, and a scanner 102.

It may be appreciated that the various components depicted may be implemented by systems such as printers, computer servers, computer laptop devices, and so on. For example a modern printer and/or printer front end may comprise the scanner 102 and logic to implement components such as the document parser 104, image generator 106, and neural network 108. "Printer front end" refers to a computer system that operates to apply settings to a printer to carry out document processing. The printer front end and printer may be integral or may be separate devices.

The document parser 104 is configured to extract a content sub-region 112 from a rasterized document 110, for example using localized OCR 130. "Localized OCR" refers to OCR performed only on a content sub-region of a document. The rasterized document 110 may be generated by a scanner 102 from a paper document 122 (paper version of the rasterized document 110). For example, the paper document 122 may be an invoice, a receipt, a bill of lading, and so on, that is transformed into rasterized format by the scanner 102. The rasterized document 110 may then be provided to the document parser 104 to extract the content sub-region 112.

The document parser 104 extracts the content sub-region 112 from the rasterized document 110 using techniques for image manipulation and editing that are well known in the art, or by identifying and extracting text from a particular region of the document (if there is a text layer or if the document is already in text format (see below)). The document parser 104 may optionally perform localized OCR 130 on the content sub-region 112. In some embodiments, the rasterized document 110 may comprise a text layer, or may already be in a text format (for example, due to OCR performed by the scanner 102 or because the document is text natively, such as a Microsoft® Word® document). In these embodiments the document parser 104 may not need to perform the localized OCR 130. Furthermore, in some embodiments the subsequent image generator 106 may transform rasterized format data into the graphical code 116 directly, without the need to perform localized OCR 130 to generate text from the content sub-region 112. "Graphical code" refers to a graphical encoding of content extracted from a document.

The document parser 104 communicates the content sub-region 112 to the image generator 106, where the image generator 106 is configured to transform the content sub-region 112 into a graphical code 116. The image generator 106 may generate the graphical code 116 based in part on topological features of the content sub-region 112. The topological features may be positioning, partitioning, or clustering of visual elements such as text, lines, shapes, as well as the absence thereof within a rasterized document 110. For example, the topological features may be the arrangement of and distribution of features that may include text such as a title, text blocks such as paragraphs, tables where text is arranged in columns and rows, graphics such as charts, logos, etc., and blank spaces separating text and graphics. These topological features may be found within the content sub-region 112 and utilized to generate the graphical code 116. In some instances, the image generator 106 may generate the graphical code 116 based on topological features having a pre-configured association with the content sub-region 112. "Pre-configured association" refers to machine settings configured before a document is processed (before processing commences). The pre-configured association between the topological features and the content sub-region 112 may be due to the positioning of the content sub-region 112 within the rasterized document 110 relative to the distribution and composition of the topological features within the rasterized document 110, or for example the use of field codes. This distribution and composition of the topological features may be indicative of a document type, information, features, or marking, found in the content sub-region 112.

The topological features, if utilized by the image generator 106, may be communicated to the image generator 106 from the document parser 104 separately from the content sub-region 112 or embedded in or along with the content sub-region 112.

The graphical code 116 generated by the image generator 106 may be a bar code. Bar codes are machine readable visual representations of data comprising at least two colors of wide and narrow bars whose arrangement represents alphanumeric values. The graphical code 116 generated by the image generator 106 may alternatively be a QR code. QR (quick response) codes are a type of matrix code comprising black squares arranged in a square grid on a high contrast background, which can be read by an imaging device. The QR code may encode data for a locator, identifier, or tracker and may use four standardized encoding modes (numeric, alphanumeric, byte/binary, and kanji) to store data. Logic and algorithms to convert various forms of content (images, text, topological features) to bar codes, QR codes, and other types of graphical code 116 are well known in the art.

The content sub-region 112 may comprise modifications to a paper version of the document overlaid on the paper version of the document (paper document 122) prior to scanning the document into a rasterized format. For example, the overlaid modifications on the paper document 122 may comprise written comments, markers such as arrows, boxes, etc., logos such as a corporate logos, stamps such as for indicating payment, acknowledgement the document was received, processing of the document, filing, etc., and/or other modifications that are applied to the paper document 122 after it was printed but before the paper document 122 is processed by the scanner 102.

In some configurations, the content sub-region 112 may comprise modifications to the document added after processing by the scanner 102. For example, after the paper document 122 is rasterized by the scanner 102 to generate the rasterized document 110, modifications may be added to rasterized document such as comments, watermarks, and annotations added using a document editing program.

Certain embodiments may utilize a neural network 108 trained to transform the graphical code 116 into one or more document classifiers. "Document classifier" refers to symbols/settings in a machine that identify category features of a document. For example, the neural network 108 may be a convolutional neural network. The classifiers may be stored in a relational index 114 in association with one or more document identifier 124, such as the graphical code 116 itself. Document classifiers generated by the neural network 108 may be utilized to identify the document or type of document associated with the graphical code 116. In one embodiment a search engine 118 operable on the relational index 114 returns the document identifiers in response to a search request 128.

A document editor 120 may embed the graphical code 116 at a predefined location 126 in the rasterized document 110. "Document editor" refers to any logic that is configured to modify the content of a document. Many types of document editors are known and popular in the art. In some implementations the predefined location 126 is a fixed location (e.g., page 1, top left margin) that does not vary by document and/or document type. In other implementations the predefined location 126 may be variable and determined by the document classifier(s) or document identifier. "Document identifier" refers to symbols/settings in a machine that uniquely identify a particular document. The predefined location 126 may vary depending on the content sub-region 112 of the particular rasterized document 110. "Predefined location" refers to settings identifying a location in a document to insert a graphical code, the settings configured before the document is processed (before processing commences).

For instance, a rasterized document 110 with particular information in the content sub-region 112, such as topological features of the content sub region or pre-configured associations of the topological features with the content sub-region 112, may define a location to place the graphical code 116 based on location of available empty space within the rasterized document 110.

The embedded graphical code 116 may subsequently be utilized to search for the document efficiently and accurately.

As evident in FIG. 1, natural language processing may be omitted from the process of classifying documents. The omission of natural language processing improves performance over conventional text-based classification approaches. Classification accuracy may also be improved due to utilizing topological features (e.g., tables, field codes) and/or feature composition (i.e., location, distribution, and density of text/graphics within the document) rather than estimating a semantic interpretation of the document text. "Field codes" refers to identifiers extracted from documents that provide interpretational context to content in particular locations of the document. Performance is also improved due to the use of localized OCR 130 vs the more extensive OCR utilized in conventional image or text based document classification approaches.

Figure 2:
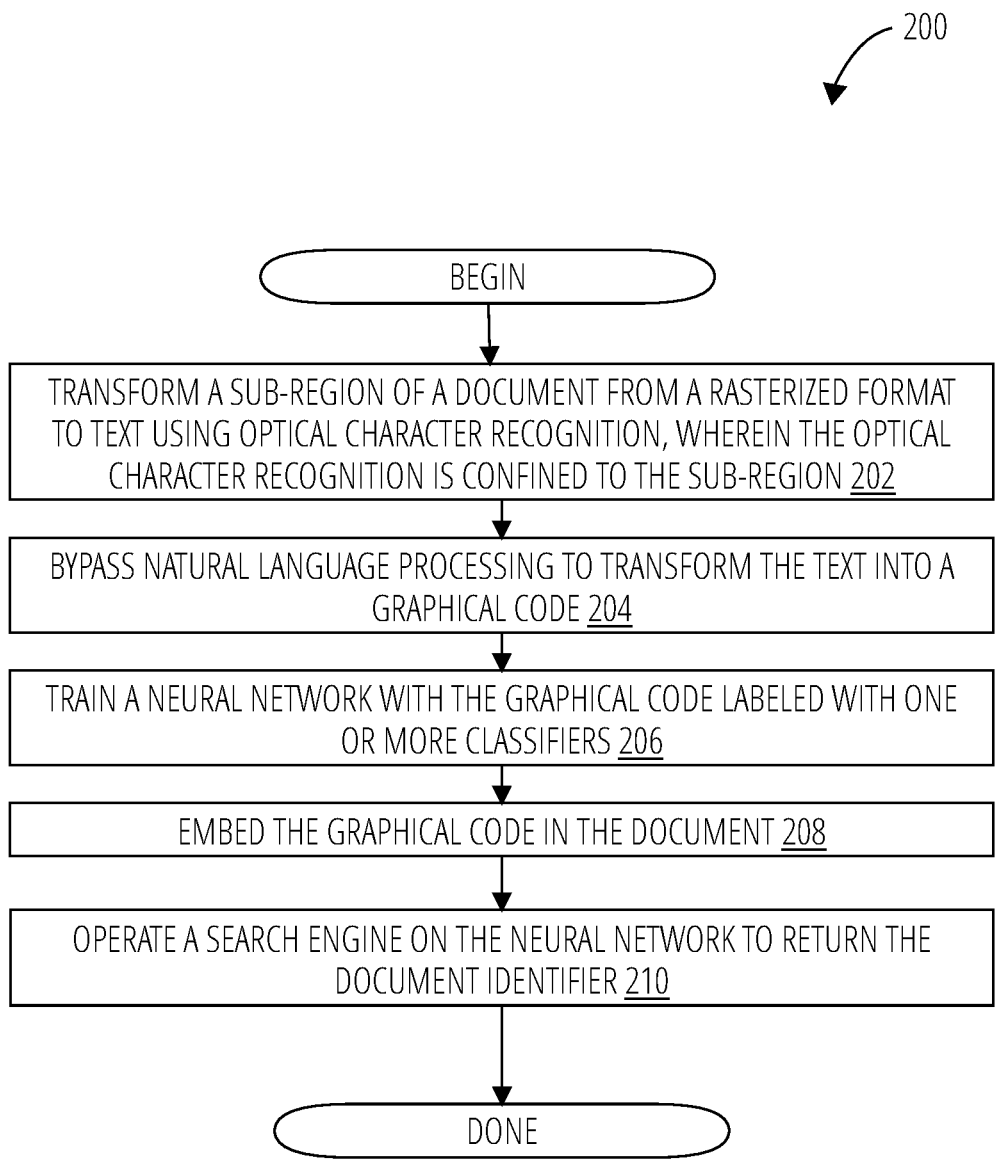
FIG. 2 is a flow chart depiction of a document processing process 200 in accordance with one embodiment.

FIG. 2 depicts a flow chart diagram of document processing process 200 in accordance with one embodiment. The document processing process 200 involves transforming a sub-region of a document from a rasterized format to text using optical character recognition, wherein the optical character recognition is confined to the sub-region (block 202). Optical character recognition may be applied to the content sub-region of a rasterized document to identify text within the content sub-region. Alternatively the sub-region may be transformed directly into a graphical code without applying OCR. The document processing process 200 thus bypasses (omits use of) natural language processing to transform the text into a graphical code (block 204).

The document processing process 200 trains a neural network with the graphical code labeled with one or more classifiers (block 206). By labeling the graphical code with one or more classifiers (document classifier) the neural network may learn to identify graphical codes generated by the image generator from new documents. The graphical code may be associated with the classifiers in a relational index, for later search and retrieval.

The document processing process 200 embeds the graphical code in the document (block 208). By embedding graphical code in the document, the document carries an identifier associated with a document classifier (one or more classifiers) that may be identified by a search request. In the block 210, the document processing process 200 operates a search engine on the neural network to return a document identifier in response to a search request.

Figure 3:
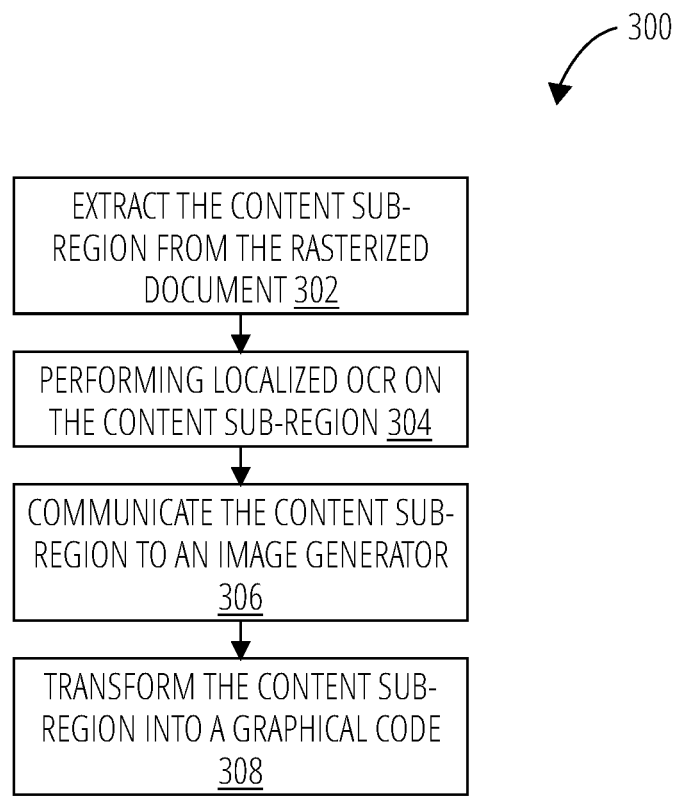
FIG. 3 is a flow chart depiction of a graphical code generation process 300 in accordance with one embodiment.

FIG. 3 depicts a graphical code generation process 300 in one embodiment. A content sub-region is extracted from the rasterized document (block 302) and localized OCR is performed (block 304) on the content sub-region. The content sub-region (possibly after localized OCR, and optionally with topological features) is communicated to an image generator (block 306) that transforms the content sub-region into a graphical code (block 308).

Figure 4:
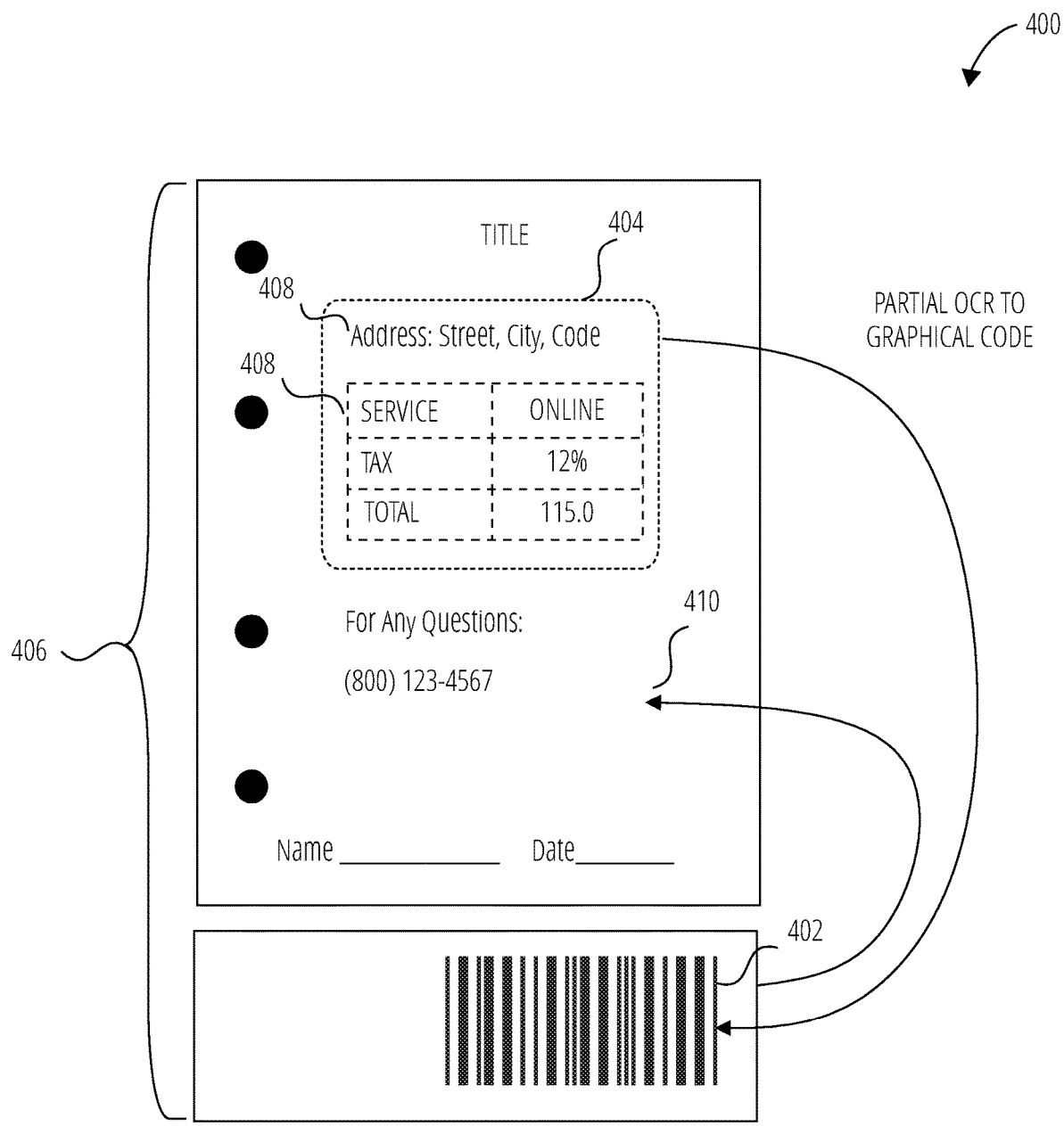
FIG. 4 graphically depicts graphical code generation 400 in accordance with one embodiment.

FIG. 4 depicts graphical code generation 400 and embedding in accordance with one embodiment. A graphical code 402 is generated from a content sub-region 404 of a document 406. The content sub-region 404 comprises topological features 408, in this example an address field and a table of values. The graphical code 402 is generated from the content sub-region 404 and embedded back into the document 406 at the predefined location 410.

Figure 5:
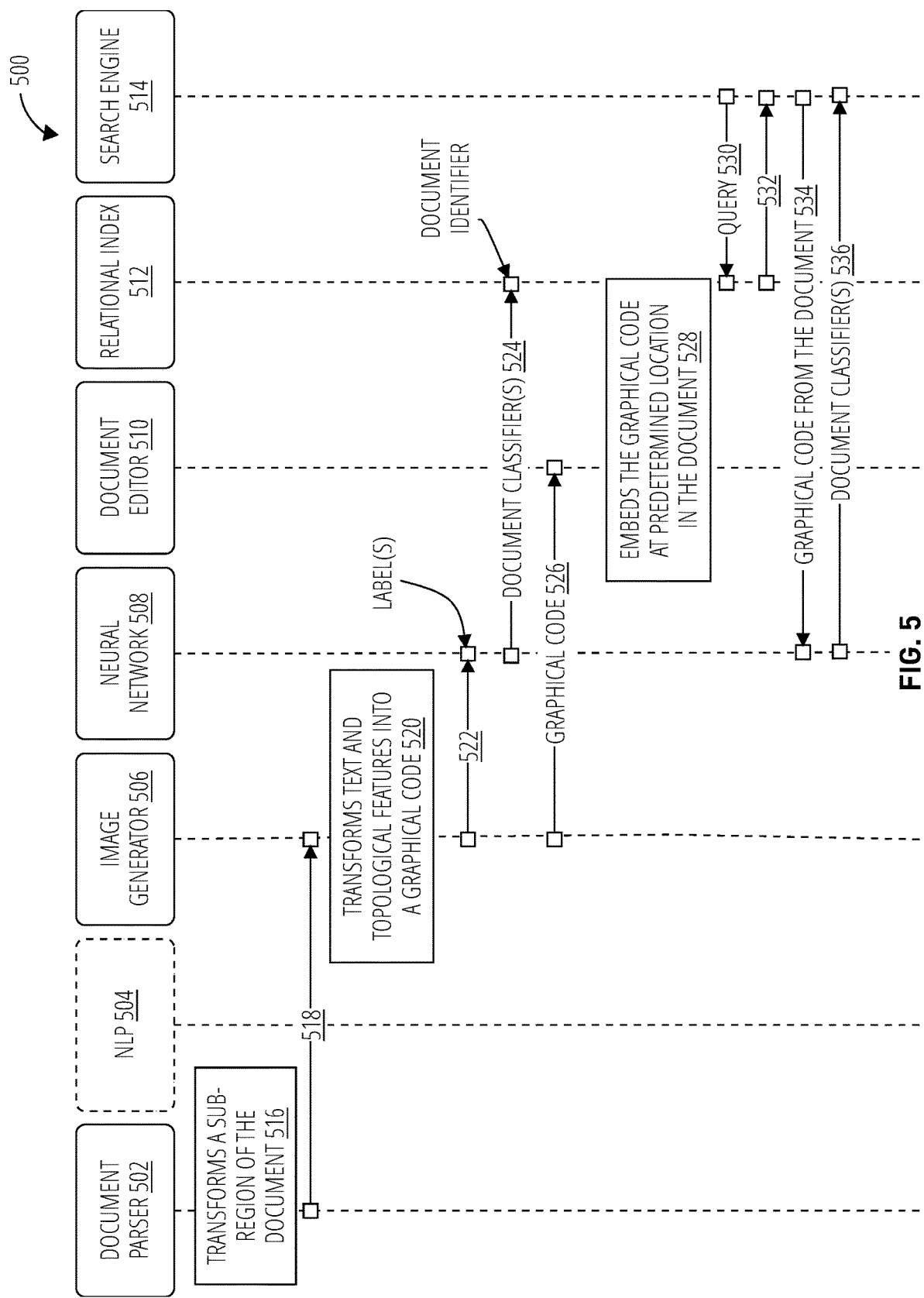
FIG. 5 is a sequence depiction of a document processing and search process 500 in accordance with one embodiment.

FIG. 5 depicts a sequence diagram for a document processing and search process 500 in accordance with one embodiment. The document processing and search process 500 is carried out between a document parser 502, an image generator 506, a neural network 508, a document editor 510, a relational index 512, and a search engine 514.

In the document processing and search process 500, the document parser 502 communicates text and document topological features 518 to an image generator 506 after the document parser 502 transforms a sub-region of the document 516. When the document parser 502 transforms a sub-region of the document 516 the transformation may be through optical character recognition process that identifies text in the text and document topological features 518 and bypasses use of NLP 504. "Document parser" refers to logic configured to extract and operate on content from documents. Many types of document parsers and parsing algorithms are known in the art. Embodiments of a uniquely configured document parser are described herein.

The image generator 506 communicates a graphical code 522 to the neural network 508 after the image generator 506 transforms text and topological features into a graphical code 520. The neural network 508 is configured to output document classifier(s) 524 after receiving the graphical code 522, and communicates the document classifier(s) 524 to the relational index 512 to be associated with document identifier(s). For training the neural network 508, labels may be applied to the graphical code 522. The image generator 506 communicates the graphical code 526 to a document editor 510 which embeds the graphical code at predetermined location in the document 528.

To locate documents matching classifiers, the search engine 514 communicates a query 530 to the relational index 512 which in response communicates one or more document identifier 532 to the search engine 514 as search results.

In some implementations, the search engine 514 may search directly for matching classifiers using the neural network 508. The search engine 514 communicates a graphical code from the document 534 (previously embedded) to the neural network 508, and in response the neural network 508 transforms the graphical code from the document 534 into document classifier(s), and communicates one or more document classifier(s) 536 to the search engine.

The neural network 108/neural network 508 may for example be implemented in one embodiment as a CNN in accordance with FIG. 6-FIG. 10. By utilizing a neural network for classification of generated graphical codes, broader and narrower classifications may be generated for documents. For example, a CNN may identify macro-features of a bar code or QR code that would not be evident to a bar code or QR code decoder, such as a general "invoice" classification vs an invoice for a specific vendor. A range of classifications may more efficiently enable document searches.

Figure 6:
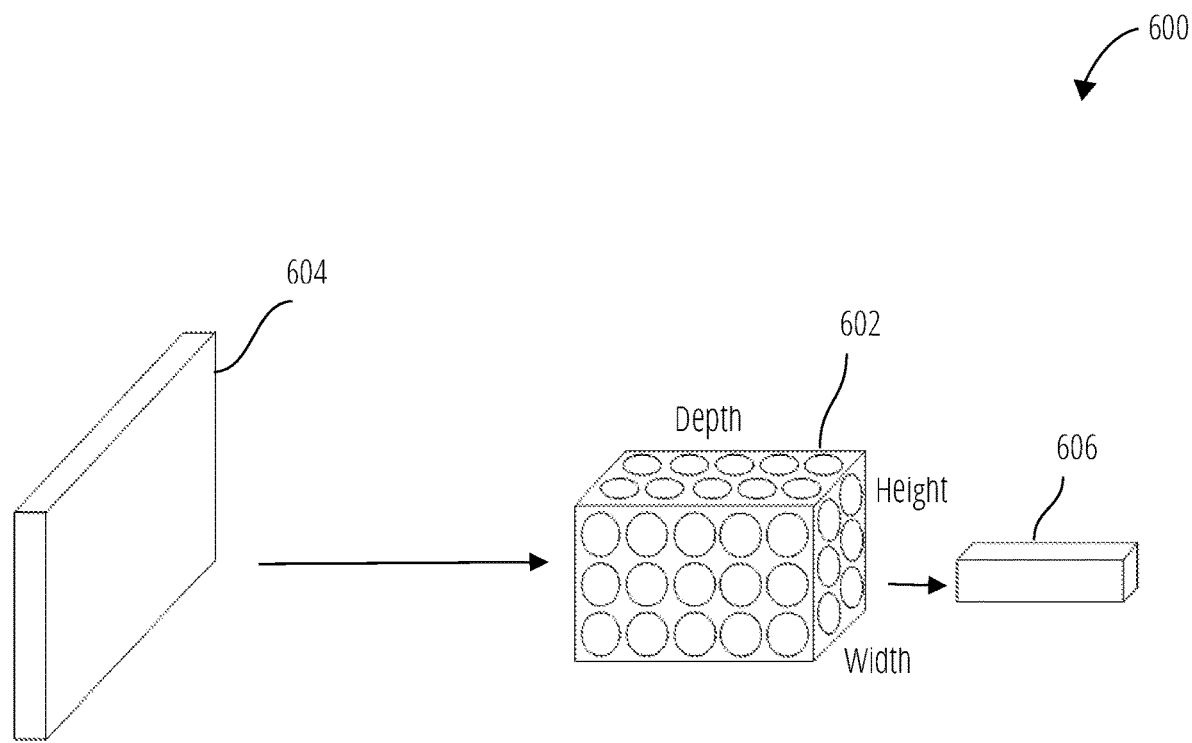
FIG. 6 depicts a convolutional neural network 600 in accordance with one embodiment.

FIG. 6 depicts an exemplary convolutional neural network 600. The convolutional neural network 600 comprises a three dimensional neuron configuration (width, height, depth), as depicted in convolutional layer 602. Layers of the convolutional neural network 600 transform a 3D volume of inputs to a 3D output volume of neuron activations. In this example, the input layer 604 encodes the image, therefore its width and height are configured to the dimensions of the image, and the depth of the 104 is configured to three (e.g., for Red, Green, and Blue channels). The convolutional layer 602 further transforms the outputs of the input layer 604. The output layer 606 transforms the outputs of the convolutional layer 602 into one or more classifications of the image content.

Figure 7:
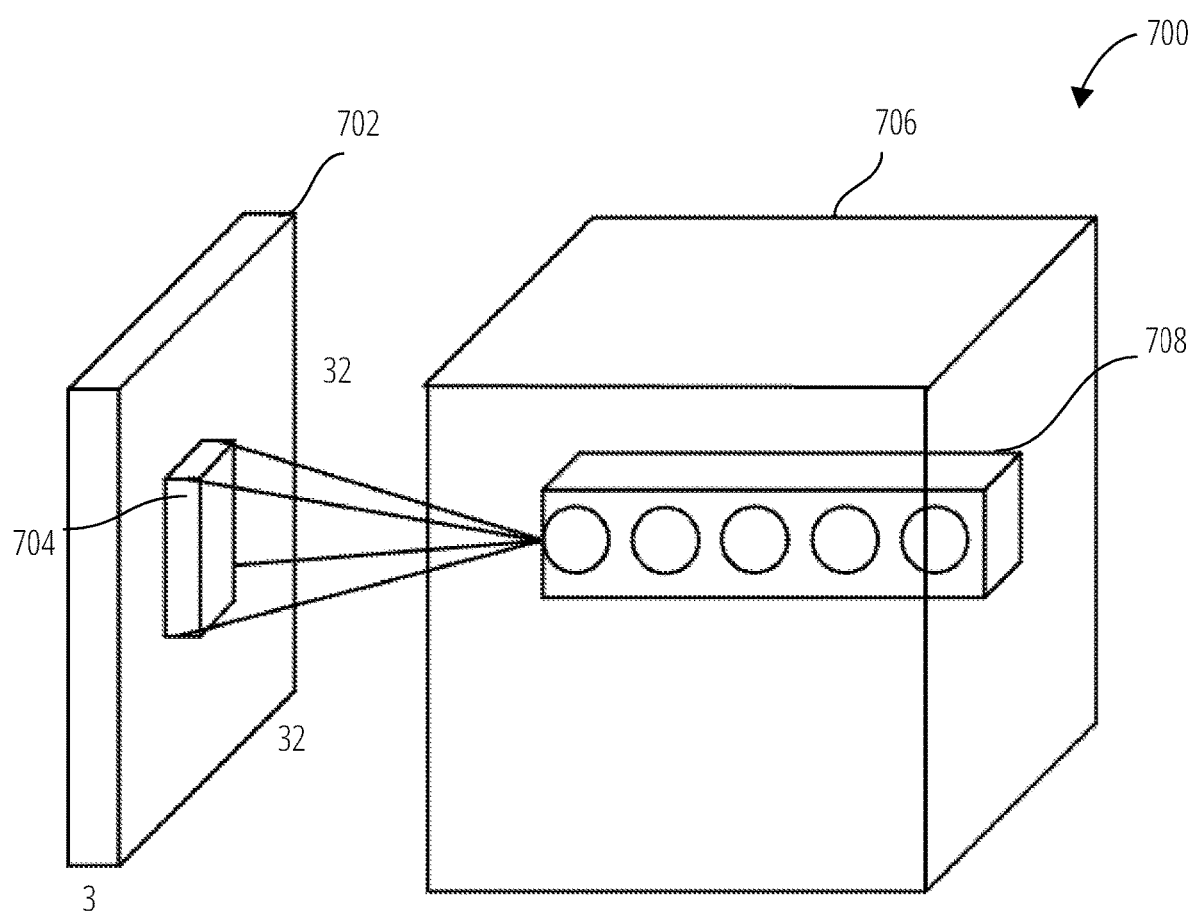
FIG. 7 depicts a convolutional neural network layers 700 in accordance with one embodiment.

FIG. 7 depicts an exemplary convolutional neural network layers 700 in more detail. In one embodiment, similar convolutional neural network architectures may be configured for both of image-based text classification and bar code/QR code classification. A convolutional neural network model comprising the same or similar types and numbers of layers, nodes, and activation functions, may be effectively utilized for both document image classification and for QR code/bar code classification. The optical characteristics of letters/text may have sufficient similarity with bar code/QR codes that the weight coefficients of the trained models may represent a level of contrast (gradients) between pixels in both cases.

An example subregion of the input layer region 704, from a tile 702 of the input layer 604 corresponding to a tile of an image, is transformed by a convolutional layer subregion 708 in the convolutional layer 706. The tile 702 in this example is 32×32 neurons (e.g., corresponding to a 32×32 tile 702), and three neurons deep (e.g., three color channels per pixel of the input region input to the tile 702). Each neuron in the convolutional layer 706 is coupled to a local region in the tile 702 spatially (e.g., in height and width), but to the full depth (i.e., to all color channels if the input is an image). There are multiple neurons (five in this example) along the depth of the convolutional layer subregion 708 that analyze the subregion of the input layer region 704 of the tile 702, in which each neuron of the convolutional layer subregion 708 may receive inputs from every neuron of the subregion of the input layer region 704.

Figure 8:
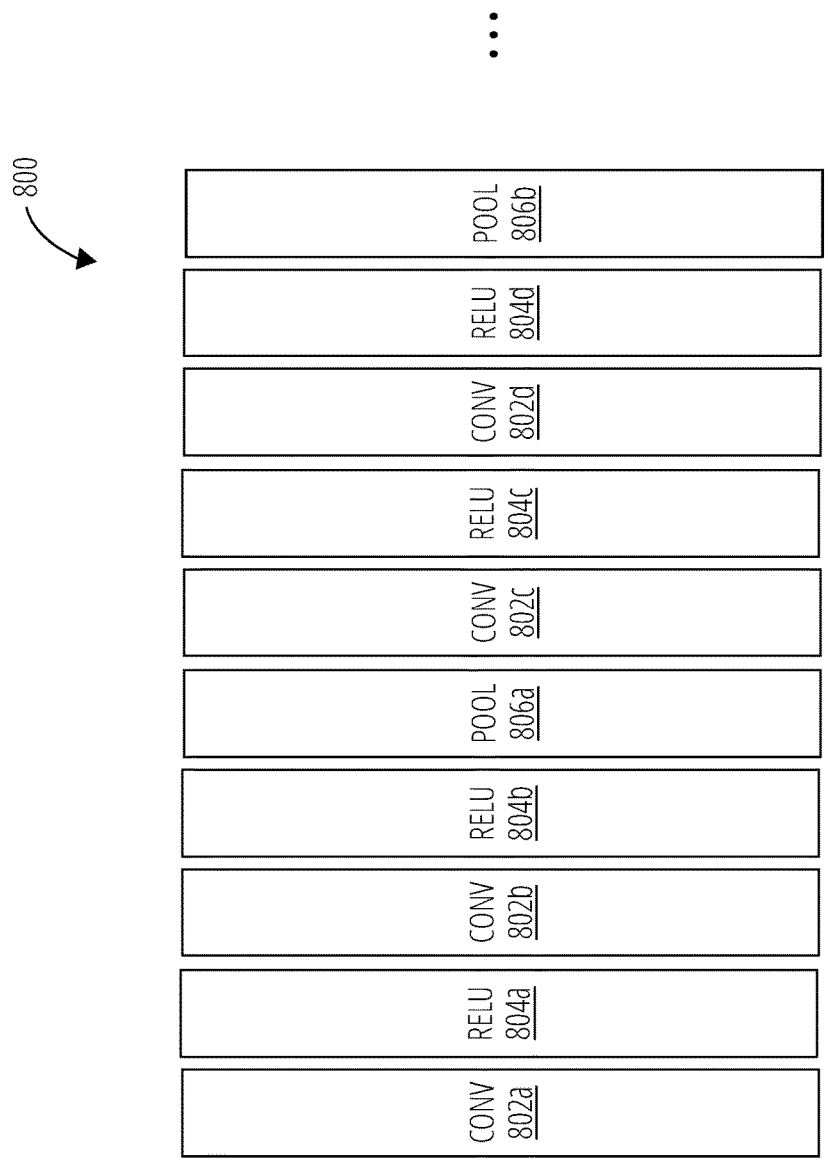
FIG. 8 depicts a VGG net 800 in accordance with one embodiment.

FIG. 8 depicts a form of a CNN known as a VGG net 800. The initial convolution layer 802a stores the raw image pixels and the final pooling layer 806b determines the class scores. The intermediate convolution layers (convolution layer 802b, convolution layer 802c, and convolution layer 802d) and rectifier activations (RELU layer 804a, RELU layer 804b, RELU layer 804c, and RELU layer 804d) and intermediate pooling layers (pooling layer 806a, pooling layer 806b) along the processing path are also depicted.

The VGG net 800 replaces the (often large) single-layer filters of basic CNNs with multiple smaller-sized (e.g., 3×3) filters in series. With a given receptive field (the effective area size of the input image), multiple stacked smaller-size filters may perform better at image feature classification than a single layer with a larger filter size, because multiple non-linear layers increase the depth of the network which enables it to learn more complex features. In a VGG net 800 each pooling layer may be small, e.g., 2×2.

Figure 9:
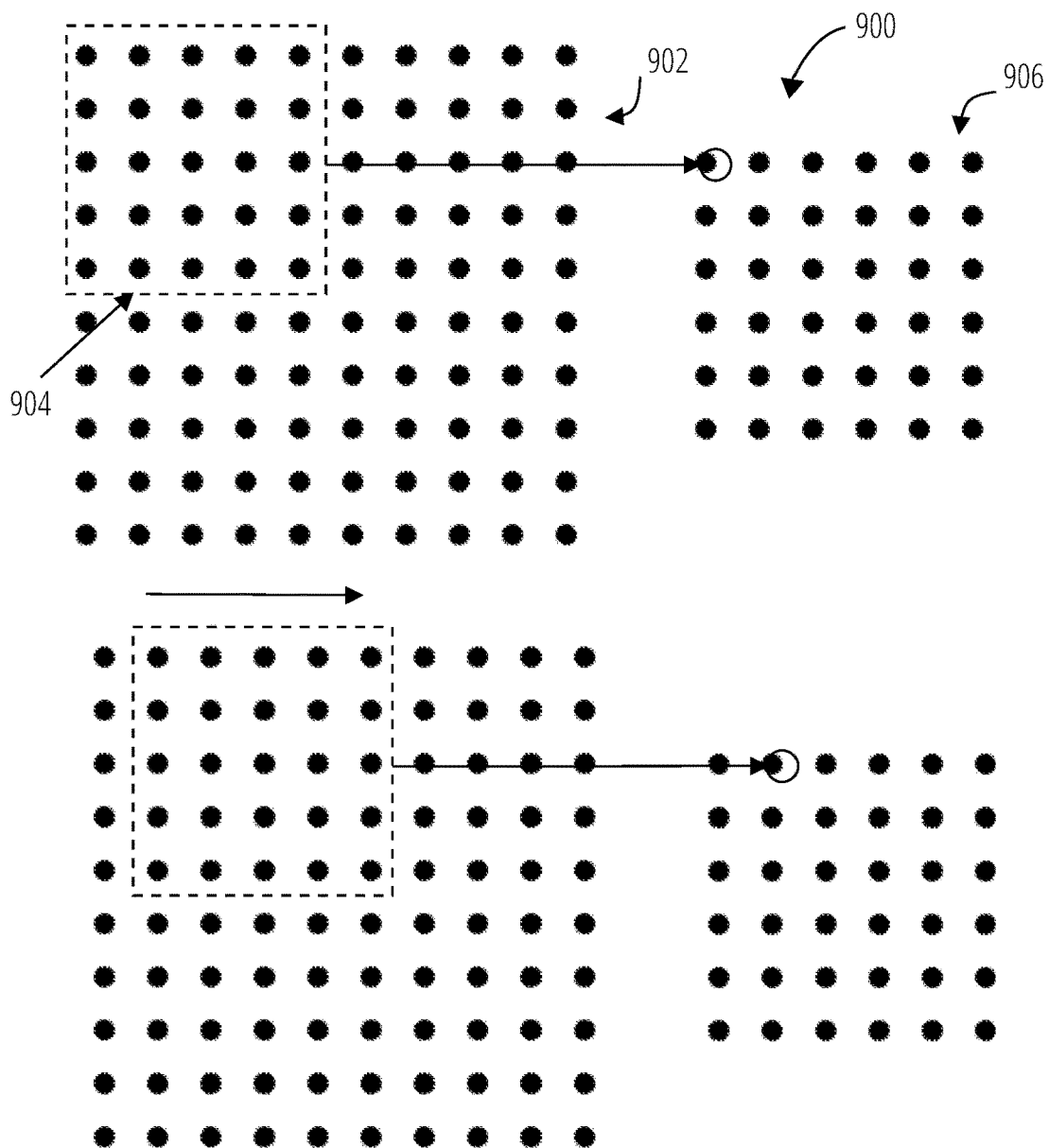
FIG. 9 depicts a convolution layer filtering 900 in accordance with one embodiment.

FIG. 9 depicts convolution layer filtering 900 that couples outputs from groups of neurons in a convolution layer 902 to neurons in a next layer 906. A receptive field is defined for the convolution layer 902, in this example sets of 5×5 neurons. The collective outputs of neurons in the receptive field are weighted and mapped to (typically one) neuron(s) in the next layer 906. This weighted mapping is referred to as the filter 904 for the convolution layer 902, or sometimes referred to as the kernel of the convolution layer 902. The filter 904 depth is not depicted in this example. In other words, the filter 904 may actually comprise a cubic volume of neurons in the convolution layer 902, not a two-dimensional area as depicted. Thus what is depicted may comprise a "slice" of the full filter 904. The filter 904 is "slid", i.e. convolved, across the input image features, each time mapping to a different neuron(s) in the next layer 906. For example FIG. 9 depicts the filter 904 slid to the right by 1 unit (the "stride" length), creating a slightly offset receptive field from the top one, and mapping its output to the next neuron in the next layer 906. The stride may be configured to other values than one (1), with larger strides reducing the overlaps in the receptive fields, and hence further reducing the size of the next layer 906. Unique receptive fields in the convolution layer 902 for the steps map to different neurons in the next layer 906. Thus, if the convolution layer 902 is 32×32×3 neurons per slice, the next layer 906 may comprise 28×28×1 neurons to cover all of the receptive fields of the convolution layer 902. This may be referred to as an activation map or feature map. There is thus achieved a reduction in layer complexity due to the filtering. There are 784 different ways that a 5×5 filter may uniquely map to a 32×32 convolution layer 902, therefore the next layer 906 may be reduced to 784=28×28 neurons. The depth of the convolution layer 902 may also be reduced from three (3) to one (1) in the next layer 906.

The number of total layers to use in a CNN, the number of convolution layers, the filter sizes, and the values for strides at each layer are examples of "hyperparameters" of the CNN.

Figure 10:
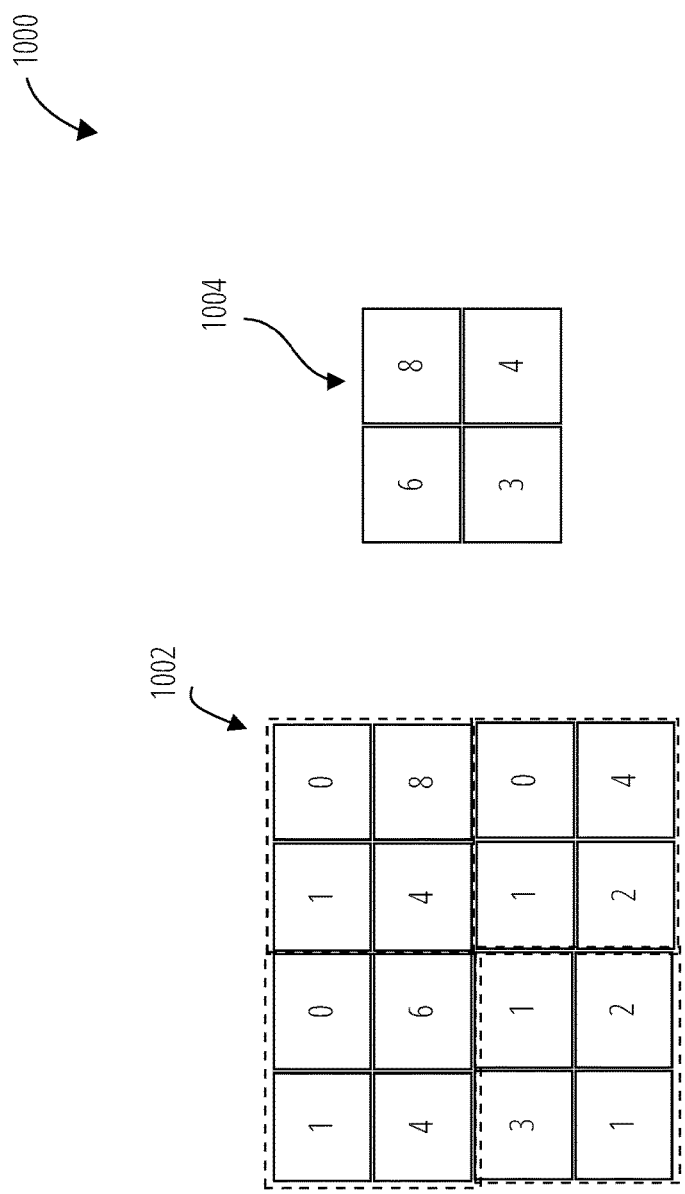
FIG. 10 depicts a pooling layer function 1000 in accordance with one embodiment.

FIG. 10 depicts a pooling layer function 1000 with a 2×2 receptive field and a stride of two (2). The pooling layer function 1000 is an example of the Maxpool pooling technique. The outputs of all the neurons in a particular receptive field of the input layer 1002 are replaced by the maximum valued one of those outputs in the pooling layer 1004. Other options for pooling layers are average pooling and L2-norm pooling. A reason to utilize a pooling layer is that once a specific feature is recognized in the original input volume with a high activation value, its exact location in the input may be less important than its relative location to other features of the input. Pooling layers may substantially reduce the spatial dimension of the subsequent layers in the neural network (e.g., for images, the length and the width change but not the depth). The amount of parameters or weights is reduced, thus lessening the computation cost, and overfitting is attenuated. Overfitting refers to when a model is so tuned to the training examples that it is not able to generalize well when applied to live data sets.

Machine Embodiments

Figure 11:
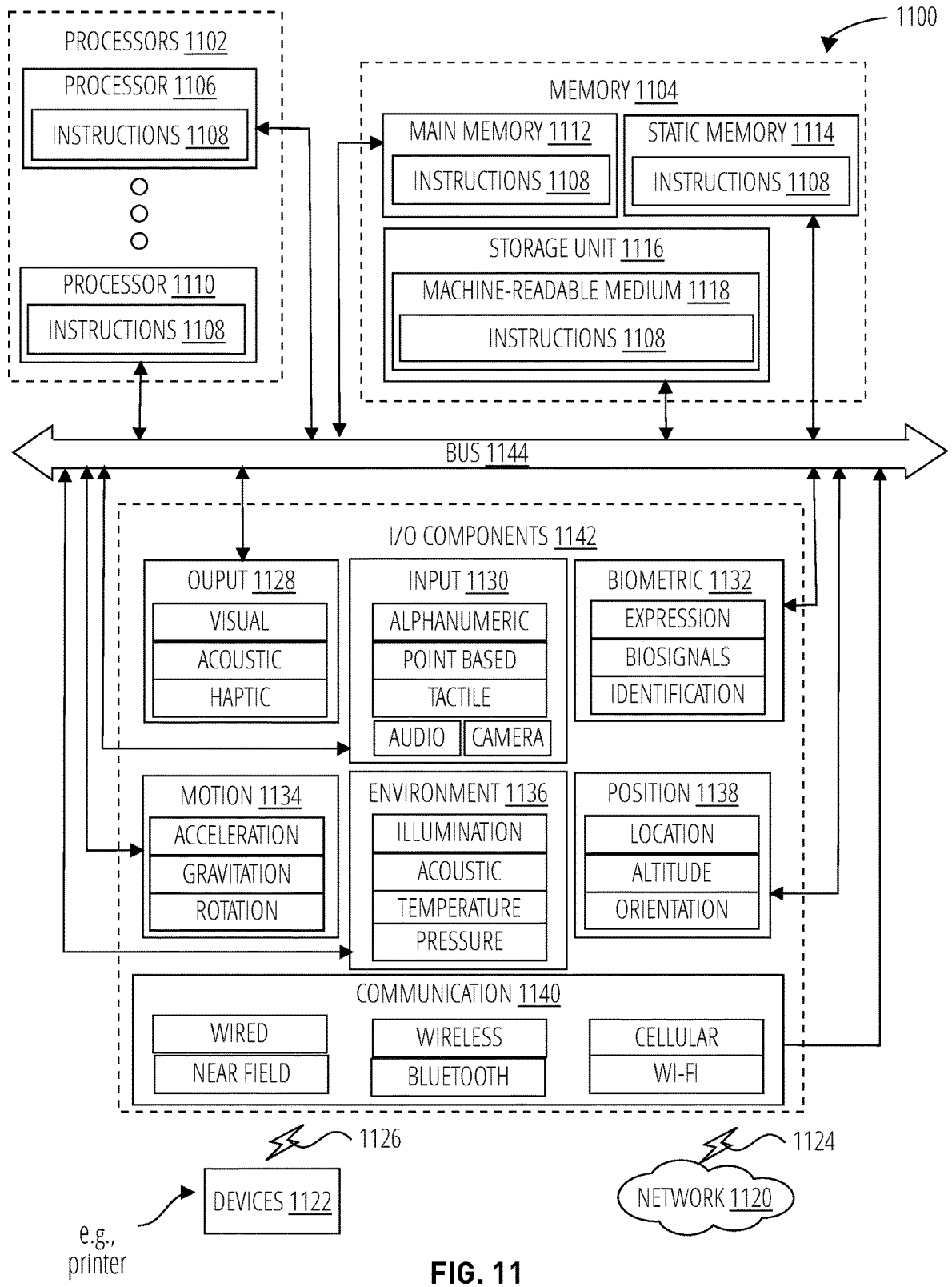
FIG. 11 depicts a diagrammatic representation of a printer front end 1100 in the form of a computer system within which a set of instructions may be executed for performing any one or more of the methodologies discussed herein, according to an example embodiment.

FIG. 11 depicts a diagrammatic representation of a printer front end 1100 in the form of a computer system within which logic may be implemented to perform aspects of the techniques disclosed herein, according to an example embodiment.

Specifically, FIG. 11 depicts a printer front end 1100 comprising instructions 1108 (e.g., a program, an application, an applet, an app, or other executable code) for causing the printer front end 1100 to perform any one or more of the functions or methods discussed herein. For example the instructions 1108 may cause the printer front end 1100 to carry out aspects of the document processing process 200, graphical code generation 400, and/or document processing and search process 500. The instructions 1108 configure a general, non-programmed machine into a particular printer front end 1100 programmed to carry out said functions and/or methods.

In alternative embodiments, the printer front end 1100 operates as a standalone device or may be coupled (e.g., networked) to other machines. In a networked deployment, the printer front end 1100 may operate in the capacity of a server machine or a client machine in a server-client network environment, or as a peer machine in a peer-to-peer (or distributed) network environment. The printer front end 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the printer front end 1100. Further, while only a single printer front end 1100 is depicted, the term "machine" shall also be taken to include a collection of machines that individually or jointly execute the instructions 1108 to perform any one or more of the methodologies or subsets thereof discussed herein.

The printer front end 1100 may include processors 1102, memory 1104, and I/O components 1142, which may be configured to communicate with each other such as via one or more bus 1144. In an example embodiment, the processors 1102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1106 and processor 1110) to execute the instructions 1108. The term "processor" is intended to include multi-core processors that may comprise two or more independent processors (sometimes referred to as "cores") that may execute instructions contemporaneously. Although FIG. 11 depicts multiple processors 1102, the printer front end 1100 may include a single processor with a single core, a single processor with multiple cores (e.g., a multi-core processor), multiple processors with a single core, multiple processors with multiples cores, or any combination thereof.

The memory 1104 may include one or more of a main memory 1112, a static memory 1114, and a storage unit 1116, each accessible to the processors 1102 such as via the bus 1144. The main memory 1112, the static memory 1114, and storage unit 1116 may be utilized, individually or in combination, to store the instructions 1108 embodying any one or more of the functionalities described herein. The instructions 1108 may reside, completely or partially, within the main memory 1112, within the static memory 1114, within a machine-readable medium 1118 within the storage unit 1116, within at least one of the processors 1102 (e.g., within the processor's cache memory), or any suitable combination thereof, during execution thereof by the printer front end 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones will likely include a touch input device or other such input mechanisms, while a headless server machine will likely not include such a touch input device. It will be appreciated that the I/O components 1142 may include many other components that are not shown in FIG. 11. The I/O components 1142 are grouped according to functionality merely for simplifying the following discussion and the grouping is in no way limiting. In various example embodiments, the I/O components 1142 may include output components 1128 and input components 1130. The output components 1128 may include visual components (e.g., a display such as a plasma display panel (PDP), a light emitting diode (LED) display, a liquid crystal display (LCD), one or more printers, a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, scanners for rasterizing printing documents, and the like.

In further example embodiments, the I/O components 1142 may include biometric components 1132, motion components 1134, environmental components 1136, or position components 1138, among a wide array of possibilities. For example, the biometric components 1132 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1142 may include communication components 1140 operable to couple the printer front end 1100 to a network 1120 or devices 1122 via a coupling 1124 and a coupling 1126, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 1104, main memory 1112, static memory 1114, and/or memory of the processors 1102) and/or storage unit 1116 may store one or more sets of instructions and data structures (e.g., software) embodying or utilized by any one or more of the methodologies or functions described herein. These instructions (e.g., the instructions 1108), when executed by processors 1102, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 1120 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1120 or a portion of the network 1120 may include a wireless or cellular network, and the coupling 1124 may be a Code Division Multiple Access (CDMA) connection, a Global System for Mobile communications (GSM) connection, or another type of cellular or wireless coupling. In this example, the coupling 1124 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1108 and/or data generated by or received and processed by the instructions 1108 may be transmitted or received over the network 1120 using a transmission medium via a network interface device (e.g., a network interface component included in the communication components 1140) and utilizing any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1108 for execution by the printer front end 1100, and/or data generated by execution of the instructions 1108, and/or data to be operated on during execution of the instructions 1108, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
    a document parser configured to extract a content sub-region from a document;
    an image generator configured to transform topological features comprising rasterized lines in the content sub-region into a graphical code;
    a neural network trained to output one or more classifiers in response to receiving the graphical code;
    a search engine operable on the one or more classifiers to return one or more document identifiers in response to a search request; and
    a document editor configured to embed the graphical code at a location in the document determined by the classifiers.

2. The system of claim 1, wherein the document parser is configured to extract the content sub-region by performing localized OCR on the document.

3. The system of claim 1, wherein the location is variable.

4. The system of claim 1, wherein the content sub-region comprises modifications to a paper version of the document applied prior to scanning the paper version of the document into a rasterized format.

5. The system of claim 1, wherein the content sub-region comprises modifications to the document added to the document after generating the document in a rasterized format using a scanner.

6. The system of claim 1, the image generator is configured to not utilize optical character recognition and to bypass natural language processing when generating the graphical code.

7. The system of claim 1, wherein the graphical code is one of a bar code and a QR code.

8. The system of claim 1, wherein the graphical code is generated based on the topological features having a pre-configured association with the content sub-region.

9. The system of claim 1, wherein text is generated by optical character recognition on the content sub-region and utilized by the image generator along with the topological features of the document to generate the graphical code.

10. The system of claim 1, wherein the document is a rasterized document.

11. A method comprising:
    transforming a sub-region of a document from content in a rasterized format to content in a text format using optical character recognition, wherein the optical character recognition is localized to the sub-region;
    bypassing natural language processing to transform the content in the text format into a graphical code;
    training a neural network with the graphical code labeled with one or more classifiers; and
    embedding the graphical code in a location in the document determined by the classifiers.

12. The method of claim 11, further comprising:
    operating a search engine on the neural network to identify the document in response to a search request.

13. A non-transitory computer-readable storage medium, the computer-readable storage medium including instructions that when executed by a computer, cause the computer to:
    transform a sub-region of a document from content in a rasterized format to content in a text format and topological features, wherein the transform is localized to the sub-region;
    bypass natural language processing to transform the content in the text format and the topological features into a graphical code; and embed the graphical code in the document at a location in the document determined by classifiers generated by operating a neural network on at least the topological features.

14. The non-transitory computer-readable storage medium of claim 13, the computer-readable storage medium including instructions that when executed by a computer, further cause the computer to:

train the neural network with the graphical code labeled with one or more classifiers.

15. The non-transitory computer-readable storage medium of claim 13, wherein the topological features comprise one or more field codes of the sub-region on the document.

* * * * *